United States Patent [19]
Leah et al.

[11] Patent Number: 5,808,601
[45] Date of Patent: Sep. 15, 1998

[54] INTERACTIVE OBJECT SELECTION POINTER METHOD AND APPARATUS

[75] Inventors: Robert Charles Leah; Scott James McAllister, both of Cary, N.C.

[73] Assignee: International Business Machines Corporation, Armonk, N.Y.

[21] Appl. No.: 527,282

[22] Filed: Sep. 12, 1995

[51] Int. Cl.$^6$ ..................................... G09G 3/02
[52] U.S. Cl. .......................... 345/145; 345/146; 345/157; 345/159
[58] Field of Search .................... 345/145, 146, 345/156, 157, 159, 160, 161, 162, 163, 167, 168, 427; 382/141

[56] References Cited

U.S. PATENT DOCUMENTS

| | | | |
|---|---|---|---|
| 4,698,625 | 10/1987 | McCaskill et al. | 345/145 |
| 5,093,867 | 3/1992 | Hori et al. | 382/141 |
| 5,508,717 | 4/1996 | Miller | 345/145 |
| 5,513,303 | 4/1996 | Robertson et al. | 345/427 |
| 5,565,888 | 10/1996 | Selker | 345/147 |
| 5,598,183 | 1/1997 | Robertson et al. | 345/147 |
| 5,642,131 | 6/1997 | Pekelney et al. | 345/145 |

*Primary Examiner*—Richard A. Hjerpe
*Assistant Examiner*—M. Fatahi Yar
*Attorney, Agent, or Firm*—Edward H. Duffield

[57] ABSTRACT

An analog to a gravitation force field is generated mathematically to operate between the displayed image of the mouse selection pointer on the screen of a computer display as it interacts with defined selectable objects on the screen. Unlike true gravity, however, the force may be mathematically defined as positive or negative and, thus, permits both attractive and repulsive effects to be imposed upon the movement of the mouse selection pointer displayed on the screen. The paradigm of interaction between the mouse selection pointer displayed on the screen and objects which are selectable thereon is changed to include effects of "mass" as represented by an effective field of force operating between the mouse selection pointer display and various selectable items on the screen. Mathematical calculation for the effective radius, or boundary, at which the force calculated to exist between a mouse selection pointer with an assigned mathematical value for mass and an object having an assigned mathematical value for mass may be easily implemented. When the displayed mouse selection pointer position on the screen comes within the force boundary of an object at which the calculated force is at least equal to the mass assigned to the mouse selection pointer attraction instantaneous capture of the mouse selection pointer to the object whose force boundary has been crossed can be achieved. Similarly, though inverse, repulsion between the mouse selection pointer and objects which are deemed unselectable by a computer application running in a computer system may also be implemented.

8 Claims, 6 Drawing Sheets

= DISPLAYED MOUSE POINTER (VIRTUAL MOUSE)

= REAL PHYSICAL MOUSE POINTER POSITION (REAL MOUSE)

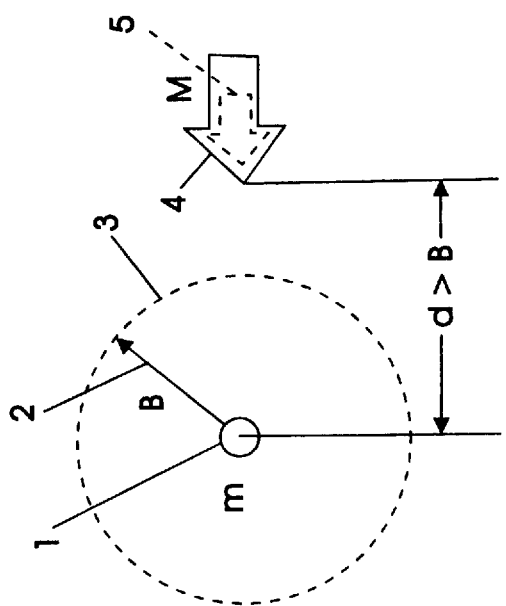
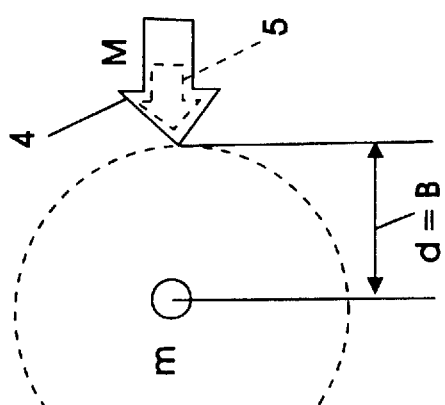
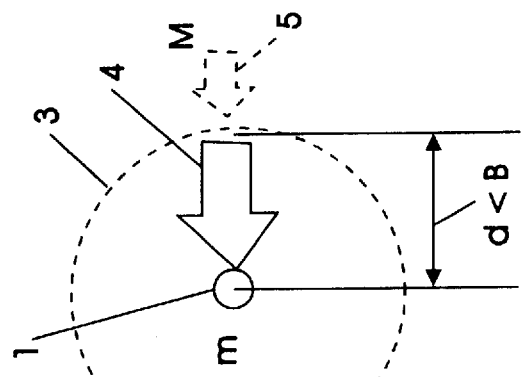

INTERACTIVE OBJECT SELECTION POINTER METHOD AND APPARATUS

FIELD OF THE INVENTION

This invention relates, generally, to computer systems and displays. Specifically, it relates to improved processes, systems and apparatuses for guiding a screen or display selection pointer by use of a mouse, joystick, track ball, pointing stick or the like, to select objects in a user interface depicted on the computer display screen.

PRIOR ART

The graphical user interfaces of today's personal computers and office desktop computers are familiar to all. Numerous software application programs and operating system enhancements have been provided to allow users to interact with selectable icons or objects on their display screens in their computer systems, utilizing graphical pointing devices. The "mouse" selection pointer, run by hand operated mouse positioner, track ball, pointer stick or the like, is the most familiar and prevalent one today. Such "mouse driven" systems employ menus and icons of graphical user interfaces, such as IBM's OS/2 (TM) based Presentation Manager (TM) or the Microsoft Corporations's Window (TM) graphical user interface for the familiar MS-DOS operating system. Most commercially available software for home use, such as games, home office applications and numerous network interfacing and browsing applications today employ the ubiquitous mouse or its equivalent tracking device for moving a selection cursor or pointer across the screen to select various elements for activation. A typical use of this capability is shown in U.S. Pat. No. 5,371,844, commonly assigned to the Assignee of the present Application, where activation of complex tasks is via the pointer interface. Similarly, U.S. Pat. No. 5,204,947, also commonly assigned to the Assignee hereof, shows a set of hypermedia linking services that includes methods for menu handling, dialog box presentation, and pointing device message handling, such as mouse message handling, as applied to the area of hypermedia object management.

While virtually all of the known pointing input devices commonly used today operate on the principle of positioning a moveable cursor or pointing device which is displayed on the screen. The pointer is moved and controlled by mechanical and electrical inputs to the computer system for repositioning the displayed pointer, the "selection mouse" cursor, on the screen. These devices, which for the sake of brevity will simply be referred to as a mouse, are used for positioning a pointing device display pointer on an object in a graphical user interface. They require the computer user to change the focus of concentration from the intellectual task that he may be performing to the more mundane mechanical task of positioning the mouse selection pointer on a finite area of a given object in order to select it for action.

Objects or icons are frequently delineated by visual boundaries, which are used to define the target for the mouse selection pointer. Due to visual acuity of users and the resolution capabilities of most available displays, there is necessarily a lower bound on the size of a selectable object that can be successfully displayed and made selectable via this type of selection technique. Consequently, a limitation is impressed upon the type and number of objects that may be depicted on any working graphical user interface, such as the common desktop metaphor. The problem becomes much more apparent as the size of the display screen shrinks (a difficulty that is readily apparent in today's laptop computers and more especially so when a track ball or a thumb operated mouse pointing device are employed). As the available display real estate on a laptop shrinks, object presentation becomes more compact and a mouse pointer tracking requires, in itself, much more manual dexterity and concentration on the user's part. Nominal tasks, such as selecting an icon or checking a selection box, manipulating scroll controls, grabbing window frames for expansion or shrinking, etc., become disruptive to the point of impeding the user's intended tasks.

OBJECTS OF THE INVENTION

In view of the foregoing noted deficiencies with the prior art mouse selection pointer, positioning controls and mechanisms, it is an object of this invention to provide an improved mouse selection pointer control program which only requires the user to position the selection pointer on the screen in some definable proximity to the desired item to be selected in order to achieve selection and activation.

Yet another object of the invention is to provide an improved computer display system with an enhanced mouse selection pointer control mechanism and method.

Another object of this invention is to provide an improved selection pointer control method in which the selection pointer is drawn toward selectable items when a near enough approach thereto has been made by the user or which is repelled from nonselectable items in like fashion.

BRIEF SUMMARY OF THE INVENTION

The foregoing, and still other objects which are not specifically enumerated, are met in a preferred embodiment of the invention by applying an analog of one of the basic laws of natural physics, gravity. An analog to a gravitation force field is generated mathematically to operate between the displayed image of the mouse selection pointer on the screen of a computer display as it interacts with defined selectable objects on the screen. Unlike true gravity, however, the force may be mathematically defined as positive or negative and, thus, permits both attractive and repulsive effects to be imposed upon the movement of the mouse selection pointer displayed on the screen. The paradigm of interaction between the mouse selection pointer displayed on the screen and objects which are selectable thereon is changed to include effects of "mass" as represented by an effective field of force operating between the mouse selection pointer display and various selectable items on the screen. Mathematical calculation for the effective radius, or boundary, at which the force calculated to exist between a mouse selection pointer with an assigned mathematical value for mass and an object having an assigned mathematical value for mass may be easily implemented. When the displayed mouse selection pointer position on the screen comes within the force boundary of an object at which the calculated force is at least equal to the mass assigned to the mouse selection pointer attraction instantaneous capture of the mouse selection pointer to the object whose force boundary has been crossed can be achieved. Similarly, though inverse, repulsion between the mouse selection pointer and objects which are deemed unselectable by a computer application running in a computer system may also be implemented.

BRIEF DESCRIPTION OF THE DRAWINGS

The invention as described with reference to a preferred embodiment thereof, which is further illustrated and explained in connection with the drawing in which:

FIG. 2 illustrates, in three progressive steps as depicted in FIGS. 2a through 2c, the pictorial demonstration of the effects of the artificial force field concept in operation on a computer display screen.

DETAILED DESCRIPTION OF THE PREFERRED EMBODIMENT

Figure 1:
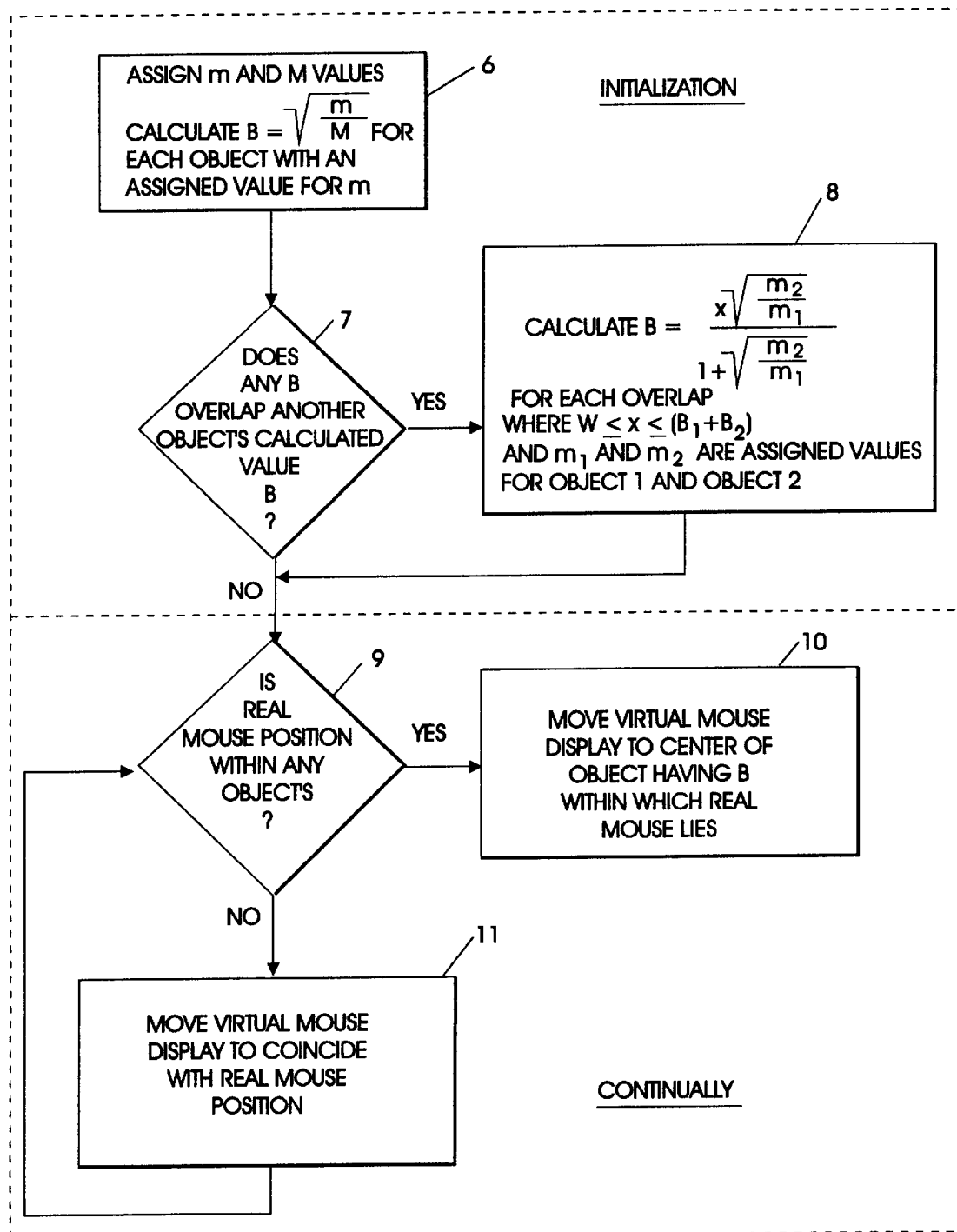
FIG. 1 illustrates the overall logical flowchart of a program or process for implementing an effective force field boundary around objects that are selectable on a computer display screen for interaction with a mouse pointer selection cursor or indicator on the same screen.

As alluded to above, an analogy to the basic gravitational law of physics is applied to interactions between one or more fixed or moveable, selectable or unselectable, objects, icons or actions that may be depicted by a typical user application program on a graphical user interface display screen or device. In such a system, a user, employing a pointing stick, joy stick, mouse or track ball device, for example, may make selections by positioning a displayed mouse selection pointer on an appropriate object and issuing a signal to the computer system that a selection is desired.

Those of skill in the art will readily understand that typical actions and interactions in a graphical user interface require a user to perform multiple selection tasks for selectable objects or functions displayed on the face of the display screen. It becomes especially difficult on small screens or with small keyboards when large numbers of selectable toolbar push buttons, window frames, check boxes, control buttons, menu choices and the like have to be simultaneously displayed and the user must navigate the selection pointer among them. The performance of each of these typical tasks requires a measurable amount of concentration and dexterity on the part of a user. The difficulty of such tasks is amplified as screens and control elements depicted on them become smaller, such as in the typical laptop computer environment today.

By artificially assigning a specific field of force factor, analogous to the physical gravitational concept of mass, to each object used in the construction of the GUI environment and to the mouse selection pointer, interactions that should physically occur between real force fields and real objects, such as attraction or repulsion, can be simulated on the face of the display screen. For example, by assigning a specific mass to one object that would be frequently selected on the GUI display, a mouse pointer having an assigned mass value would be attracted to the object if it approached within a boundary surrounding the object, even if it has not crossed onto the object's visually depicted boundary itself. Attraction between the mouse selection pointer could cause it to automatically position itself on the selectable "hot spot" required to interact with the depicted selectable object. This quickly alleviates the most difficult part of the user's task which is positioning the mouse selection pointer accurately within the visual bounds of the selected object's hot spot prior to invoking selection by clicking the mouse controls.

It should be clearly understood that true gravity or force fields are not generated in this invention. Rather, via mathematical simulation and calculation, the effect of such force fields in the interaction between the objects can be easily calculated and used to cause a change in the displayed positioning of the objects or of the mouse selection pointer. At the outset, however, several concepts must be introduced before the specifics of the artificial analog to a gravity force field and its application in the preferred embodiment are discussed.

Notably, a distinction is made between the concept of a "real mouse pointer" and a "virtual mouse pointer". In normal parlance today, there is no such distinction. The physically displayed position of a mouse selection pointer image on the face of a display screen is the only known position of any selection pointer. However, in accordance with the preferred embodiment of this invention, the mouse selection pointer characteristics are split between two entities. The properties to be provided between the entities are the following:

1. The true physical location on the screen where the computer system hardware knows the mouse pointer to be located.
2. The visual representation of the mouse selection pointer which is displayed on the screen.

This visual representation of the mouse selection pointer is typically located at the true, physical location on the screen where the mouse pointer has been positioned by the user in today's systems. Such a concurrence of a visual representation of the mouse selection pointer and the user's positioning signals to the computer system are not, however, necessary. In today's normal usage, the location that the mouse control device in the hand of the user gives to a program, when the program asks where the mouse is currently physically positioned, is always the same as the true location at which the user has positioned the controls for the mouse selection pointer.

To exploit the concept of a force field or gravity, the mouse's set of properties is split between two entities. The entities are called herein the real mouse and the virtual mouse. The real mouse pointer and the virtual mouse pointer divide the properties that are normally associated with today's usual mouse selection pointer mechanisms. In this dichotomy, the real mouse pointer possesses only the true physical location of the mouse selection pointer as it is known to the computer system hardware. That is, the actual location of the tracking mechanism of the mouse selection pointer across the user's desktop depicted on a screen is possessed by the real mouse. The virtual mouse pointer takes the other two properties, namely the visual representation of the mouse selection pointer's location and the responsibility for telling a user's application program where the visual selection pointer actually is.

Thus, when using our invention, a user makes a selection with the mouse pointer mechanism and it is the virtual mouse pointer's location whose positioning signals are used to signal the computer program and allow it to deduce what object a user is selecting, not the real mouse's actual physical location. In other words, when using the preferred embodiment of the invention, the user positions with his tracking or control mechanism the virtual mouse selection pointer across the screen of his computer system's display and "clicks on", i.e., sends a signal that the position of the mouse in association with objects displayed on the screen is intended to invoke action or select an object in association with the position of the selection pointer displayed on the screen.

This may be easily envisioned with regard to FIG. 2 in which three consecutive FIGS. 2a through 2c, show interaction between the real physical mouse pointer, the displayed mouse pointer, and a selectable object on a display screen in a user's computer system.

In FIG. 2a, an arbitrary selectable icon or item on the face of the screen is shown as 1, which may depict a push button, for example. The push button 1 will be assigned a mathematical mass value m in accordance with the preferred embodiment of the mouse pointer control process depicted in FIG. 1, which will be described later. The displayed mouse selection pointer 4 and the real, physical mouse selection pointer 5 have positions coincide with one another, as shown in FIG. 2a, in most normal operation. That is, the user positions the mouse selection pointers 4 and 5 by means of his track ball, mouse tracking device, pointer stick, joy stick or the like in a normal fashion and sees no difference in operation depicted on the face of his user's screen. However, in accordance with the preferred embodiment, the mouse selection pointer 4 is deemed to be the "virtual mouse" while the "real mouse" pointer 5 is assigned a mass value M. It is distinguished from the real physical mouse pointer position in the drawing of FIG. 2 by being depicted with solid lines, while the real physical mouse pointer position is depicted in dashed or dotted lines.

In FIG. 2b, it is shown that the user has positioned the mouse selection pointer to touch, but not cross, a boundary 3 calculated by the computer system process of FIG. 1 to exist at a radius or boundary dimension B surrounding the selectable object 1. The boundary B has a radius depicted as 2 in these figures. It will be observed that in FIG. 2a, the dimension d between the mouse selection pointer displayed and the active mass center of the selectable object 1 depicted on the screen is such that the boundary dimension 3 is much less that the distance d between the pointer and the selectable object. In FIG. 2b, the mouse selection pointer is positioned just on the boundary where the dimension d equals the boundary dimension B. At this point, both the real physical mouse pointer position and the displayed virtual mouse pointer position still coincide, as shown in FIG. 2b. However, turning to FIG. 2c, when the user positions the mouse selection pointer to just cross the boundary dimension B, i.e., when the dimension d is less than or equal to B, the two entities of mouse selection pointer become apparent.

As soon as the computer calculations indicate that the dimension d between the current mouse position of the real physical mouse 5, having the assigned mass M, and the selectable object 1, having assigned mass m, is less than the calculated dimension B for the radius of effect of the force field or gravity about the selectable object 1, the visually displayed position of the virtual mouse selection pointer 4 is moved to the hot or selectable portion of object 1 at once. The real physical location of the actual mouse pointer 5 as operated by the controls under the user's hands has not changed in so far as the user is concerned; however, the visually observable effect is that the virtual mouse selection pointer 4 has become attracted to and is now positioned directly on, the selectable object. This effectively gives the user a range of selection and accuracy, which is the same dimension as the boundary B dimension for the perimeter of the force field 3 as shown. The user no longer need be as accurate in positioning the mouse selection pointer.

Due to the fact that the force fields depicted are not real and no real gravity is involved, negative effects as well as positive effects may easily be implemented simply by changing the sign of the value of force field to be calculated, or assigning a negative value to one of the masses used in the calculation.

Turning to FIG. 1, the overall process and logic flow for implementing a preferred embodiment of the invention will now be discussed.

In FIG. 1, the first step is shown in box 6 in which a value for the boundary dimension B is calculated for each selectable object on the screen to which a user or an application program designer has assigned a value for m. In this system, the operating system provider, mouse driver provider or user has assigned a mass value M to the mouse pointer. Since the well known formula for gravity, $f=m/d^2$, where m is the mass of an object, and d is the distance from the object's center of gravity at which the force is to be calculated, is well known, a very simple method exists to calculate the boundary condition B at which the force is calculated to be equal to the mass M assigned to the mouse pointer. At this condition being calculated, it may be deemed that the effective "mass" of the mouse M will be overcome by the force f between it and an object. It is only when the mouse selection pointer displayed on the screen is overcome by the force of gravity that the virtual mouse selection pointer, which is the actual displayed mouse pointer 4 on the screen, separates from the real, undisplayed, mouse selection pointer 5 physical position to be attracted to or repelled from the object's mass. The real mouse pointer 5 has no visual representation, but the virtual mouse pointer 4 is displayed at a location which is under the control of a user until the displayed location moves within a boundary B where the acting calculated force exceeds the assigned mass value given to the mouse pointer in the program. It is then that the virtual mouse selection pointer 4 displayed moves, by virtue of the fact that the control program depicted in FIG. 1 causes it to do so.

So long as the force calculated between the mouse's displayed current position and the selectable object having a mathematical mass value m does not overcome the assigned value of mass M of the mouse, the virtual and real mouse pointers 4 and 5 have the same location, i.e., they coincide wherever the user positions the displayed selection pointer. However, when the force calculated from the aforementioned simple law of gravity exceeds the mathematical mass value M, the mouse personality splits as was depicted in FIG. 2c. The boundary condition at which the calculated force would be greater or equal to the mass value M is calculated from the basic law of gravity so that B is equal to the square root of m divided by M. The calculated boundary B surrounds the selectable object as shown in FIG. 2a with a boundary 3 having a dimension B as depicted by designation numeral 2 as it surrounds a selectable object 1. It may be noted here that, where the display is outfitted to depict and recognize three dimensions, the force field is actually spherical for a point source and interactions with a moveable mouse selection pointer in all three dimension would be possible. However, given the two dimensional restrictions of today's screens and devices, the mouse will be described in the two dimensional system only for simplicity.

Figure 6:
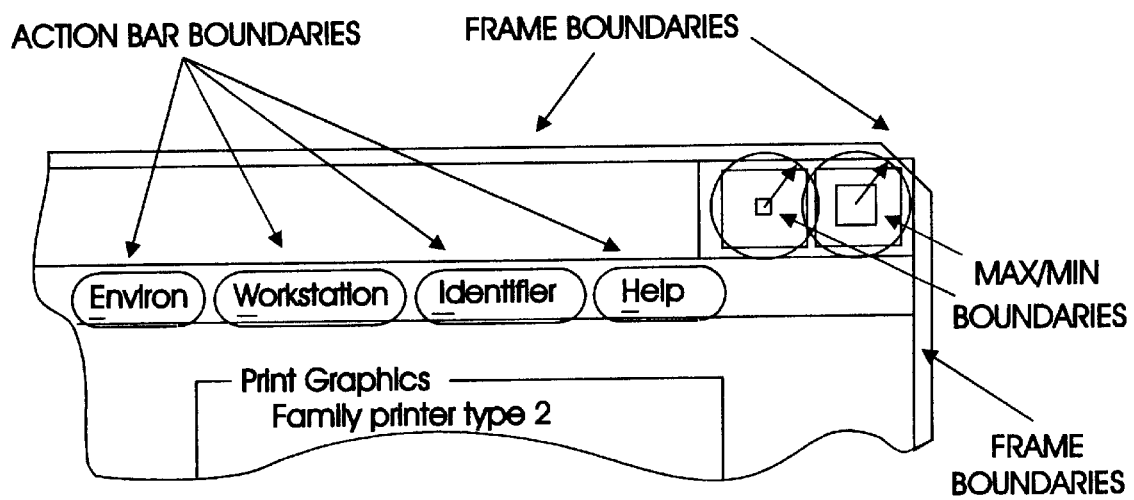
FIG. 6 illustrates a typical example in which one or more overlapping or non-overlapping force field boundaries surround a plurality of selectable-action icons or functions invocable in a graphical user interface on a typical computer display screen.

Graphically represented, the boundary B for a point mass m is a circle about a center of gravity having a radius B. If the center of mass of an object was in a line, whether straight or curved, then the boundary would be a dimension of constant distance on a perpendicular to the line, and would be a cylinder in three dimensional space. In a two dimensional screen system, however, the cylinder instead intersects the plane of the screen display in two lines, both of which are parallel to the center of gravity line of the object. A boundary of this type around elongated menu item selection areas is depicted in FIGS. 5 and 6, for example, and is depicted around a selectable button in FIGS. 4a through 4c, and around rectangular or square buttons assigned point source mass functions in FIG. 3, for example.

Returning to the discussion of FIG. 1, the boundary dimension B is calculated as stated for each object on a user's display screen, which has been assigned a mass value m. Next, the question is asked in box 7 by the mouse selection pointer control program, whether any object's boundary B overlaps another object's calculated boundary value B. If the answer is yes, a more complex calculation for the effective radius or dimension of the boundary is necessary and will be described later in greater detail. This calculation is shown in box 8. Following either calculation from box 7 or 8, box 9 is entered and the question is asked whether the real physical mouse position under control of the user lies within any object's boundary B. If the answer is yes, the control program logic of FIG. 1 causes the displayed virtual mouse selection indicator 4 to move to the center of the object having the boundary B within which the real physical mouse 5 was determined to lie. If, however, the real physical mouse location 5 does not lie within any object's boundary B, then the virtual mouse 4 displayed coincides with the real mouse position as shown in box 11 of FIG. 1. The process is iterative from boxes 9 through 11 as the user repositions the mouse controls around the screen of the user's display in his computer system. Whenever the condition of box 9 is not met, i.e., when the real physical mouse position 5 lies outside of any object's boundary condition B, then the virtual mouse 4, which is actually the displayed mouse selection pointer on the screen, is displayed to coincide with the real physical mouse position 5 under control of the user. However, whenever the real physical mouse position lies within the boundary condition B of any selectable object as determined in box 9, the virtual mouse selection indicator 4, which is actually displayed, is moved to the center of the selectable object having the boundary B condition b within which the real physical mouse 5 was determined to lie.

Figure 4A:
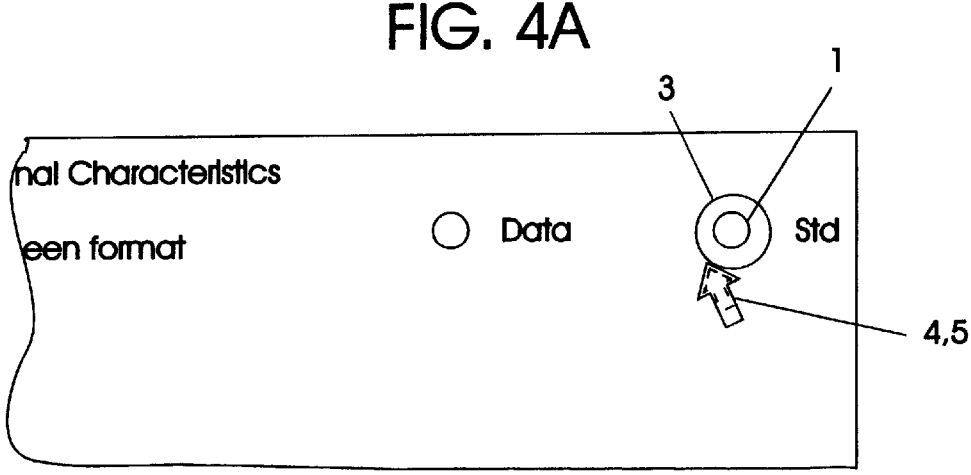
FIG. 4, as depicted in FIGS. 4a through 4c, illustrates an actual example of a mouse selection pointer arrow interacting with a selectable object on the face of a display system.
Figure 4B:
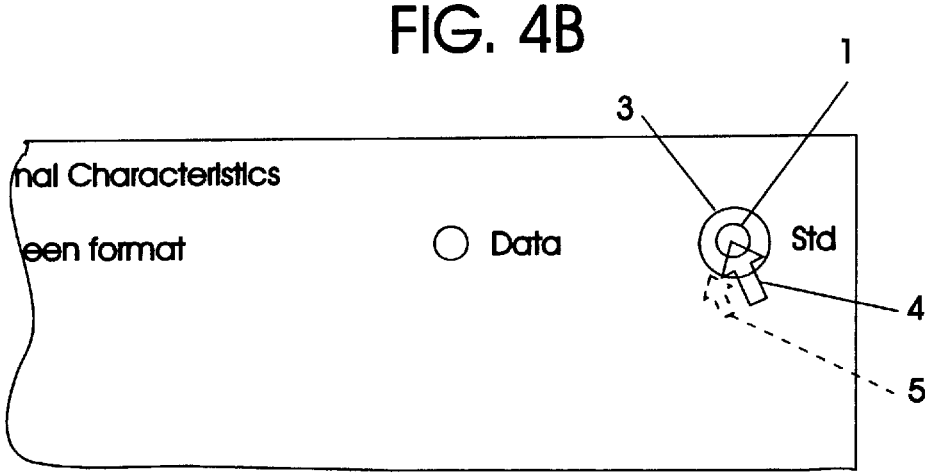
Figure 4C:
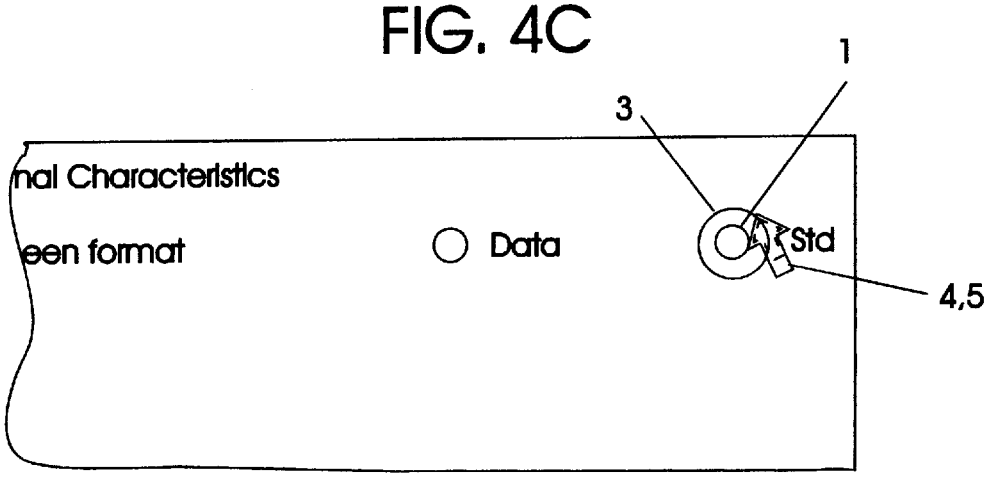
Figure 5:
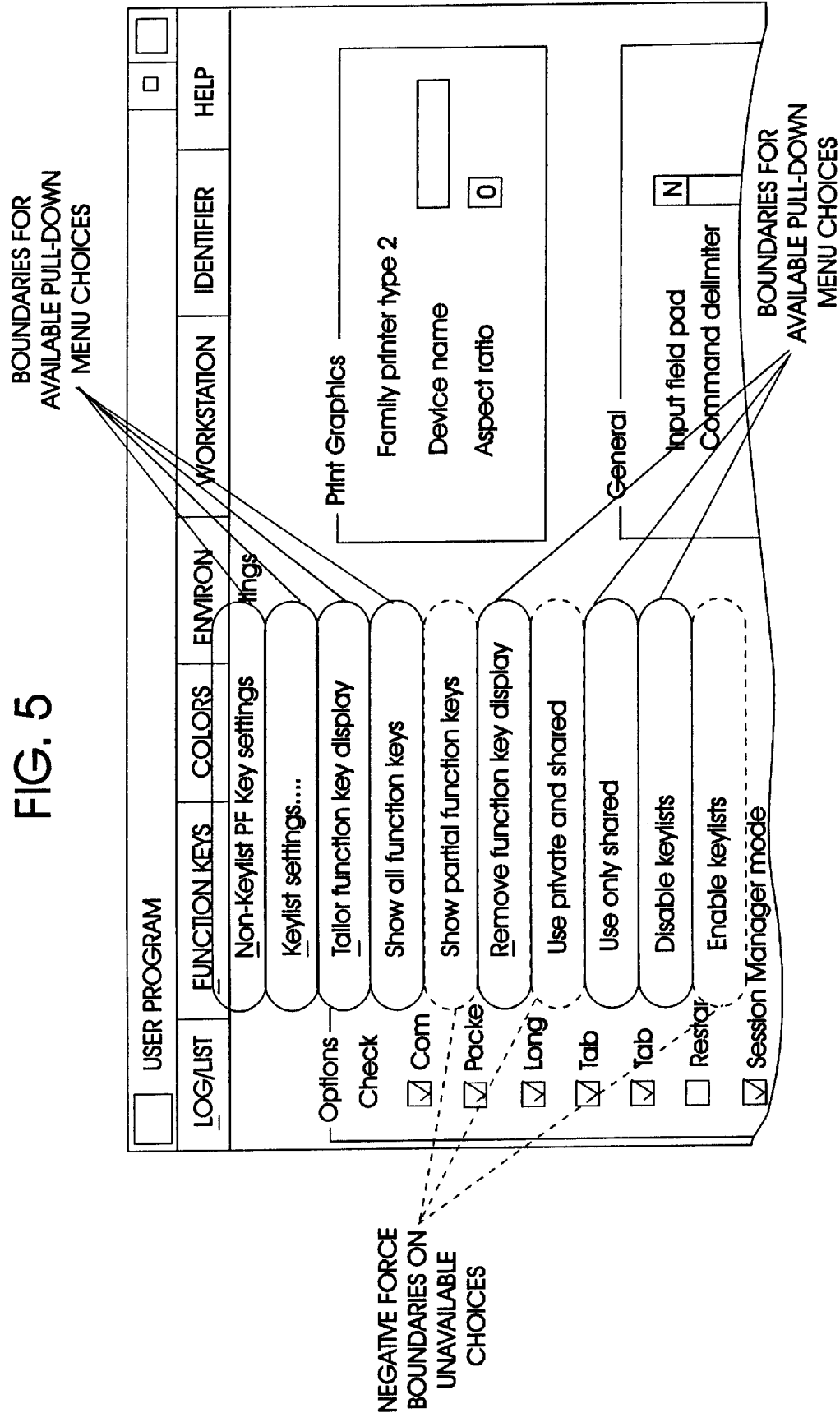
FIG. 5 illustrates an implementation of an invention in which both negative force boundaries on unavailable choices and positive force boundaries on available selections from a pull-down menu on a graphical user interface are implemented according to the invention.
Figure 7:
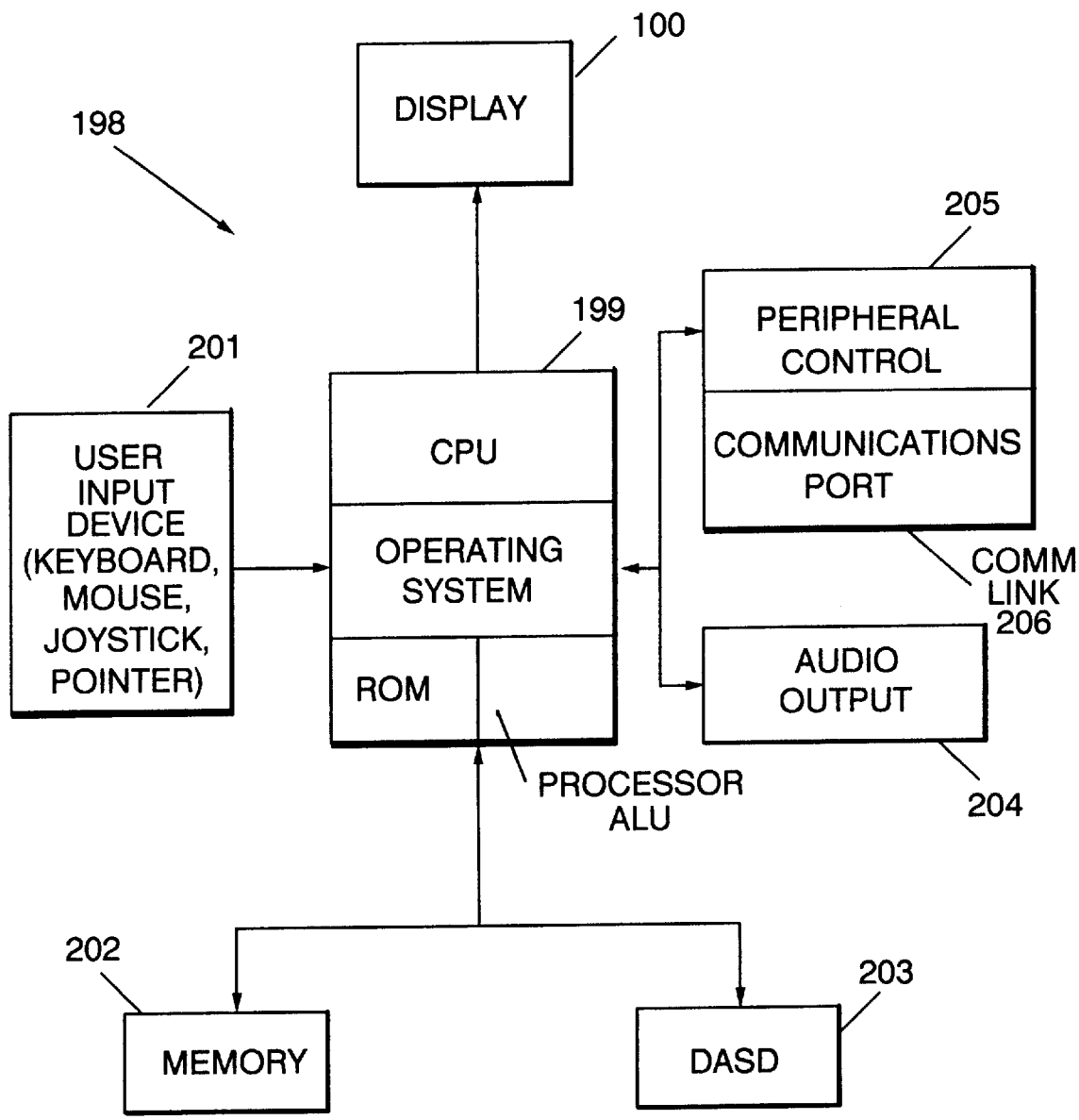
FIG. 7 illustrates schematically a typical computer system employing a mouse or pointer stick, track ball or the like as an input device for moving the mouse selection pointer on the face of a display screen.

To illustrate this, a portion of a hypothetical display screen from a user's program showing a typical radio selection button for a data condition (being either "data" or "standard") with the data and standard control buttons being potentially selectable as shown in FIG. 4a. The selectable object is button 1 which indicates a "standard" condition. Button 1 has an imaginary boundary B, shown as numeral 3, around it which would not be visible, but which is shown in this figure to illustrate the concept. The positionable mouse selection pointer is both for the real and virtual mouse as shown by the numeral 4, 5 in FIG. 4a where the user has positioned it to just approach, but not cross, the boundary 3 surrounding the selectable standard control button 1. In FIG. 4b, however, the user has repositioned the mouse selection pointer controls so that the real physical position 5 has just intersected the boundary 3, at which time the distance d from the selection pointer 5 to the selectable object 1 will be less than the dimension of the boundary B shown by the circle 3 in FIG. 4b. It is then that the virtual displayed mouse selection pointer position 4 moves instantly to the center of the selectable button 1. If the user continues to move the actual physical mouse position controls, the real or physical mouse 5, depicted in the dotted lines for the arrow 5 in FIG. 4b, will eventually cross the boundary B going away from the selectable object 1 and the real and virtual mouse selection pointers will again coincide as shown in FIG. 4c.

As shown in FIG. 4b, the virtual mouse selection pointer 4, which is the actual displayed mouse pointer indicia, would appear to be "stuck" on the center of gravity of the selectable button 1, and would seemingly stay there forever. However, the calculated force acts upon the location that is calculated for the real, physical mouse selection pointer 5, not on the depicted position of the actually displayed virtual mouse selection pointer 4. Therefore, once the process of FIG. 1 calculates that the real physical mouse position no longer lies inside the dimension of boundary B surrounding a selectable object, the virtual mouse selection pointer 4 which is displayed will be moved by the program to coincide with the actual physical location which it receives from the user's mouse-driving selection mechanism.

Figure 3:
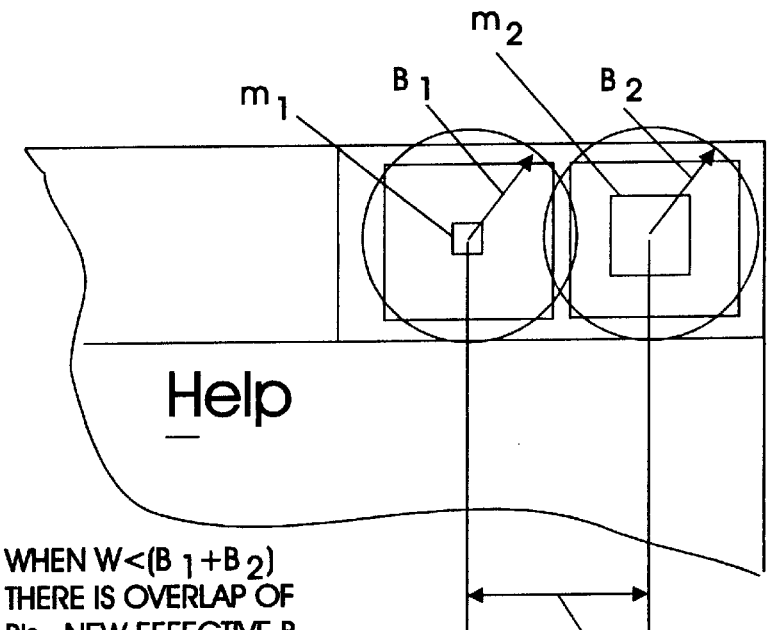
FIG. 3 illustrates in greater detail the complex interaction of multiple objects having intersecting or overlapping force fields on the surface of the display screen or device.

Returning to FIG. 1, it was noted with regard to box 8 that a more complex calculation for the boundary B would be necessary if multiple objects have calculated boundaries that overlap. This condition is illustrated in FIG. 3 in which two selectable objects $m_1$ and $m_2$ having boundaries $B_1$ and $B_2$ are depicted. The distance between the centers of action of the two objects is shown as W, which is less than the sum of the boundary dimensions $B_1$ plus $B_2$. When this condition is true, the boundary value B that results is calculated as shown in Box 8 of FIG. 1 over a range of values for a variable X which lies in the range between W and the sum of $B_1$ plus $B_2$. It is this value of the effective boundary B that is utilized in the process to determine whether the actual physical position of the mouse selection pointer lies within the boundary B when there is an overlap of boundaries condition as detected in box 7 of the process in FIG. 1. It is this value of B which is used as the test in box 9.

Turning to FIG. 5, an actual depiction of an implementation of force or gravity-effected boundaries about available menu item choices in a user's program GUI display on the screen of a user's computer system is shown, along with a number of negative force or gravity boundaries about unavailable choices according to the same user program. FIG. 5 shows that both positive and negative gravity or force effects may be invoked within the same program and handled by the same process as shown in FIG. 1 to allow a user to select or to cause the user's selection pointer display to be attracted to and repelled from available and unavailable choices, respectively.

FIG. 6 illustrates an implementation of the invention in which a plurality of selectable action bar items in a user's GUI, together with maximize and minimize buttons and frame boundaries about a displayed window of information, may all be implemented with the gravitational effects. It should be noted that the boundaries shown about the various selectable items where the force boundary B is calculated to exist need not be shown and, in the normal circumstance, ordinarily would not be shown on the face of the display screen in order to avoid clutter. However, it would be possible to display the boundaries themselves, if it were so desired.

It will be observed in the foregoing discussion that the preferred embodiment of the invention makes selection of a plurality of crowded, perhaps small sized selectable items on the face of a user's laptop or small portable or palm top computer system device to be greatly enhanced and facilitated. It is no longer necessary for the user to accurately select an exact point on a selectable item in order to invoke its actions. Instead, the user need only approach within a prescribed boundary. The boundary may be calculated in accordance with the invention quite simply and used as the determining criteria within which the user can select the selectable function or within which the user may be automatically disallowed to make any selection for unavailable function.

Having thus described our invention with regard to a preferred embodiment thereof as depicted in the several drawings and explained in detail, it will be apparent to those of skill in the art that numerous departures from the exact implementation are possible without violating the essential principles of calculating an effective force boundary about selectable objects and calculating the interactive effect of that force boundary on a moveable depicted selection pointer element without departing from the spirit and scope of the invention, wherefore, what is desired to be protected by Letters Patent is set forth in the accompanying claims by way of example only, and not of limitation, in which what is claimed is:

1. An improved selection pointer display control method executable in a computer system having a processor, a display and a selection pointer; positioning system, comprising steps executable in said processor for:

determining the distance D between the center of said mouse selection pointer having an ascribed mathematical value for mass M and the center of said at least one displayed object having an ascribed mathematical value for mass m;

calculating the value $B=\sqrt{m/M}$; and determining if the magnitude of the value of B is greater than or equal to D and, responsive thereto, moving said displayed selection pointer relative to said at least one displayed object.

2. A method as described in claim 1, wherein:

said motion of said displayed mouse selection pointer is toward or away from said at least one displayed object in accordance with the mathematical sign ascribed to said calculated value B.

3. A method as described in claim 2, wherein:

said motion of said mouse selection pointer is away from said at least one displayed object whenever the mathematical sign ascribed to said calculated value of B is negative and said determined value D is less than B, and said motion of said mouse selection pointer is toward said at least one displayed object when the mathematical sign ascribed to said calculated value of B is positive and D is less than B.

4. A method as described in any one of claims 1–3, wherein:

said moving of said displayed mouse selection pointer is independent of the actual physical location of the mouse as established by an operator adjusting mouse positioning controls whenever the value of said B is greater than D.

5. An interactive selection pointer control program comprising steps executable in a computer system having a selection pointer positioning mechanism and a processor and a display, for:

determining the distance D between the center of said mouse selection pointer having an ascribed mathematical value for mass M and the center of said at least one displayed object having an ascribed mathematical value for mass m;

calculating the value $B=\sqrt{m/M}$; and determining if the magnitude of the value of B is greater than or equal to D and, responsive thereto, moving said displayed selection pointer relative to said at least one displayed object.

6. A program as described in claim 5, wherein:

said motion of said displayed mouse selection pointer is toward or away from said at least one displayed object in accordance with the mathematical sign ascribed to said calculated value B.

7. A program as described in claim 6, wherein:

said motion of said mouse selection pointer is away from said at least one displayed object whenever the mathematical sign ascribed to said calculated value of B is negative and said determined value D is less than B, and said motion of said mouse selection pointer is toward said at least one displayed object when the mathematical sign ascribed to said calculated value of B is positive and D is less than B.

8. A program as described in any one of claims 5–7, wherein:

said moving of said displayed mouse selection pointer is independent of the actual physical location of the mouse as established by an operator adjusting mouse positioning controls whenever the magnitude of the value of said B is greater than D.

* * * * *